June 4, 1968 E. R. STROIK 3,386,861
THERMOCOUPLE WITH CAST IRON CONTACTING JUNCTION
Filed Oct. 23, 1964 2 Sheets-Sheet 2
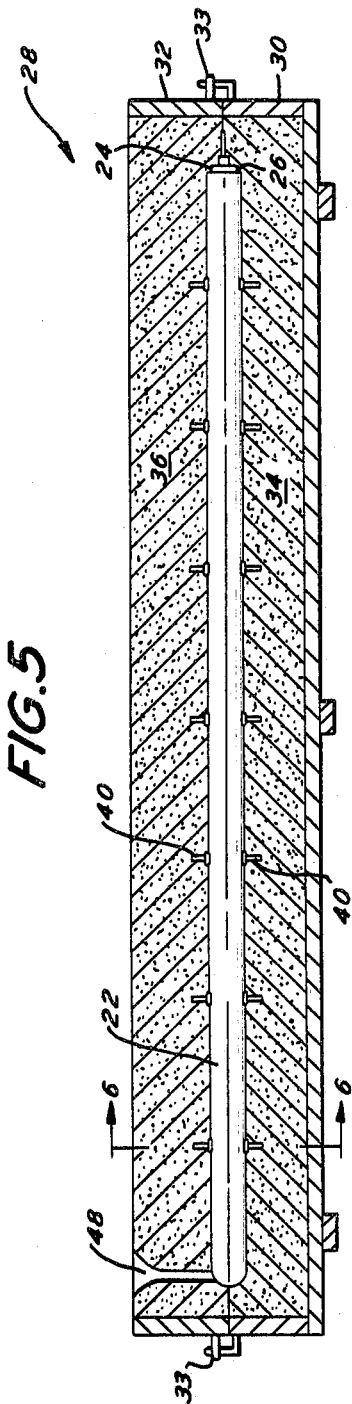
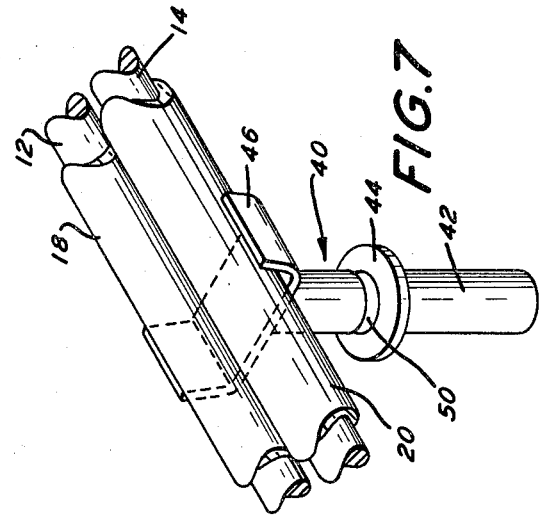
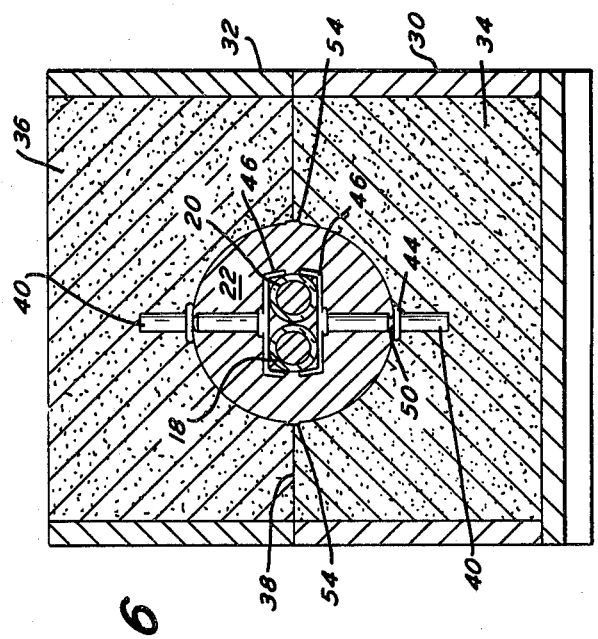
INVENTOR.
EDWARD R. STROIK
BY
Caesar, Rivise, Bernstein & Cohen
ATTORNEYS.

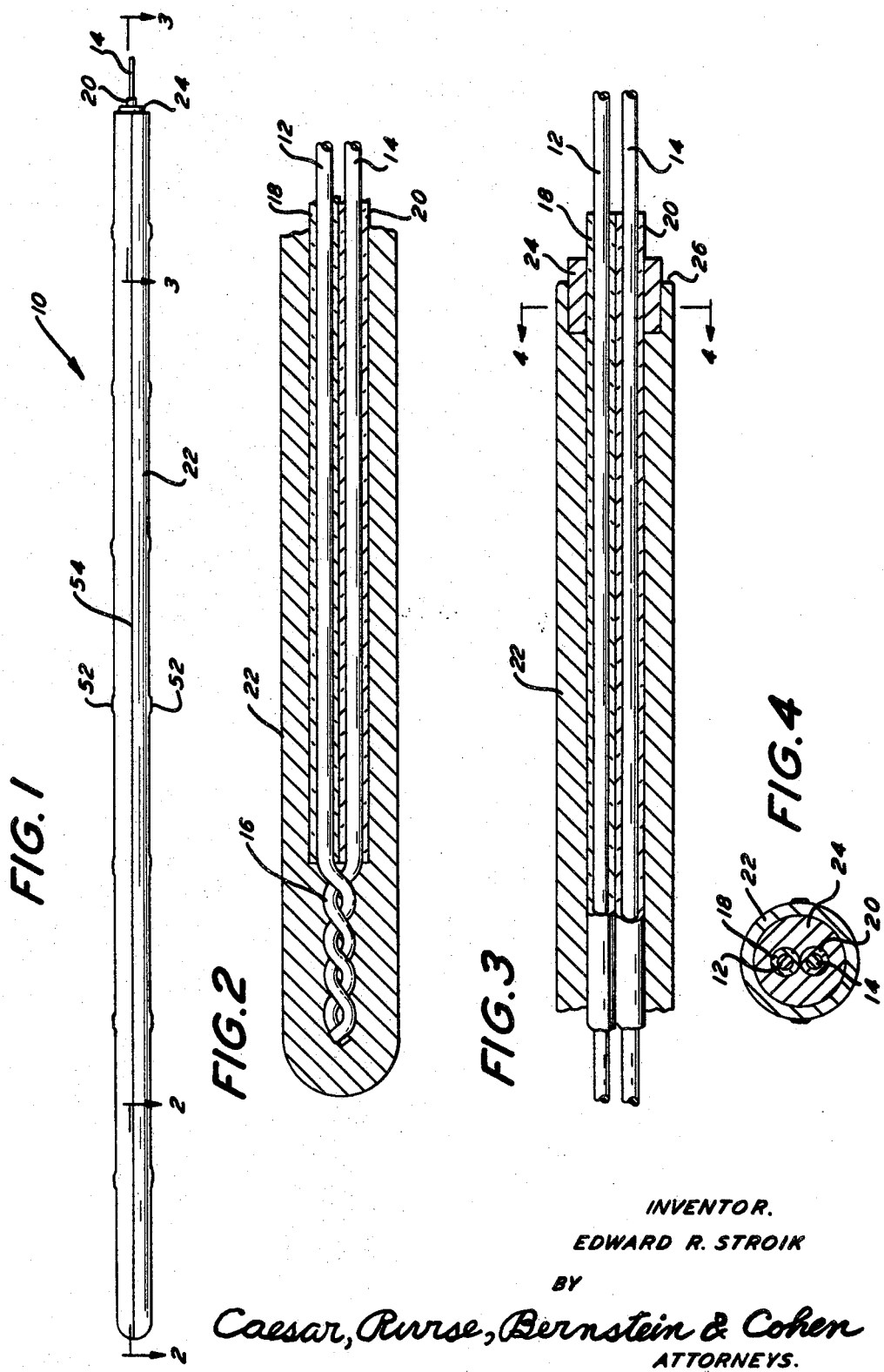

United States Patent Office 3,386,861
Patented June 4, 1968

3,386,861
THERMOCOUPLE WITH CAST IRON
CONTACTING JUNCTION
Edward R. Stroik, 535 Dehaven Ave.,
Penndel, Pa. 19047
Filed Oct. 23, 1964, Ser. No. 406,082
4 Claims. (Cl. 136—233)

ABSTRACT OF THE DISCLOSURE

A thermocouple comprised of a first metal wire and a second metal wire. The metals of the first and second wires are dissimilar from each other, with one end of each being joined together to form a measuring junction. The wires are otherwise insulated from each other and are integrally secured in an elongated cast iron member.

---

The invention relates to a high temperature thermocouple, and more particularly, to an improvement in a thermocouple primarily used for obtaining the temperature of molten metal, such as aluminum or liquid sodium-zinc.

It is currently the practice in the aluminum industry to take the temperature of molten aluminum baths by inserting a thermocouple comprising a cast iron cylinder having a hollow bore with the thermocouple wires fitted within said bore. The cast iron has a melting point which is higher than the melting point of aluminum and is therefore relatively stable from this standpoint for this purpose. However, these thermocouples have a relatively short life since the aluminum will alloy with the cast iron, and eventually the cast iron will break down thereby permitting the aluminum to enter the bore. At this time, the aluminum will immediately fill the bore, thereby shorting out the thermocouple wires and rendering the thermocouple useless for its intended purpose.

One of the bases of this invention was the realization of the problems involved with the prior art high temperature thermocouples. Thus it has been found that one of the reasons for breakdown with the prior hollow bore thermocouples was that the hollow bore was not formed concentrically within the cast iron. Thus, the sand core used in the casting in many cases was shifted thereby causing the wall of the cast iron to be thinner in some areas than others. It was this thin wall that would break down during use. Once the breakdown occurred, the thermocouple was rendered useless almost immediately since the bore would immediately fill with the molten aluminum.

The thermocouple of this invention obviates this problem of the prior art thermocouples of this type, and in addition, possesses many advantages of its own. Thus, a breakdown of the wall of the cast iron in the thermocouple of this invention will not immediately render the thermocouple useless for its intended purpose. In this way, the life of the thermocouple is substantially extended. Additionally, it is not necessary to form a hollow bore in the cast iron casing. Thus there is less chance of eccentricity resulting in the formation of the cast iron casting. Among the other advantages of the thermocouple of this invention are longer life, improved speed of response, and lower maintenance.

It is therefore an object of this invention to provide a novel thermocouple.

It is another object of this invention to provide an improved high temperature thermocouple.

It is a further object of this invention to provide a high temperature thermocouple which has a longer life as compared to the high temperature thermocouples currently being used.

It is a further object of this invention to provide a high temperature thermocouple that possesses an improved speed of response.

These and other objects of this invention are accomplished by providing a thermocouple comprising a first metal wire and a second metal wire, the metal of said first wire being dissimilar from the metal of said second wire, with one end of said first wire being joined with one end of said second wire to form a measuring junction, said wires being otherwise insulated from each other, and said wires and said measuring junction being cast in cast iron.

Other objects and many of the attendant advantages of this invention will be readily appreciated as the same becomes better understood by reference to the following detailed description when considered in connection with the accompanying drawings wherein:

FIG. 1 is a side elevational view of the thermocouple of this invention;

FIG. 2 is an enlarged partial sectional view taken along the line 2—2 of FIG. 1;

FIG. 3 is an enlarged partial sectional view taken along the line 3—3 of FIG. 1;

FIG. 4 is a sectional view taken along the line 4—4 of FIG. 3;

FIG. 5 is a sectional view showing the method of sand molding the thermocouple of this invention;

FIG. 6 is an enlarged sectional view taken along the line 6—6 of FIG. 5; and

FIG. 7 is a perspective view showing one of the chaplets supporting the insulated thermocouple wires of this invention prior to the sand molding of the cast iron.

Referring now in greater detail to the various figures of the drawings wherein similar reference characters refer to similar parts, a thermocouple embodying the present invention is generally shown at 10 in FIG. 1. Device 10 basically comprises a first wire 12, a second wire 14, and a measuring junction 16 which is formed by the twisting of the exposed ends of both wires. Although the measuring junction has been shown as being formed by the twisting of two wires, it is to be understood that this measuring junction can be formed by any method known to the art, such as the fusion of the wires.

Wires 12 and 14 are mounted in insulating sleeves 18 and 20 respectively. The wires and their insulating sleeves are cast in a cast iron cylinder 22. The cast iron is actually cast onto the insulating sleeves and measuring junction 16 and is in physical contact with the same throughout its length. Thus, as seen in FIG. 2, the cast iron actually fills the interstices between the twisted wires in the measuring junction 16. A lava seal 24 separates insulators 18 and 20 from the rear of cylinder 22. Lava is a conventional high temperature insulating material. As seen in FIG. 4, insulators 18 and 20 pass through the seal 24. The purpose of lava seal 24 is to insure that wires 12 or 14 will not inadvertently come in contact with cast iron cylinder 22 during use. Thus, if the seal were not present, wires 12 or 14 might be bent slightly and contact the cast iron cylinder 22, thereby causing a short circuit and an inaccurate reading. As seen in FIG. 3, the rear edge of lava seal 24 extends outwardly beyond the rear edge 26 of cylinder 22.

As is common to all thermocouples, wires 12 and 14 are of dissimilar metals. Substantially any metal combinations normally used for thermocouples can be used for the thermocouple of this invention. The one major exception is that pure copper cannot be used because its melting point is too low. In one embodiment, one wire can be Chromel, which comprises 90% chrome and 10% nickel, and the other wire can be Alumel, which comprises 85% chrome, 5% nickel, 3% aluminum, and 7% other elements, such as iron, cobalt and manganese. Another combination which may be used is a platinum wire and a wire made of 87% platinum and 13% rhodium. Any gage wire between 8 and 24 can be used.

Insulating sleeves 18 and 20 are made of any glass which can withstand thermal shock and will not be affected by temperatures of up to 2800° F., the normal melting point of cast iron. One such glass that can be used is Vycor, which is a high silican glass. Another type of glass that may be used is Pyrex. The internal diameter of the sleeves fitting over the wires will closely conform to the external diameter of the wires.

The outer cylinder 22 can be made from any cast iron. The cast iron used will normally have the following nominal chemical composition:

|  | Percent |
|---|---|
| Silicon | 2.30 |
| Sulfur | max .17 |
| Phosphorus | max .25 |
| Manganese | .50–.65 |
| Total carbon | 3.25–3.50 |

The balance of the cast iron is iron.

The iron can be cast in and around the thermocouple wires by any method known to the art. The most convenient method which can be used is that of sand casting, which is generally illustrated at 28 in FIG. 5. In this method, a flask is provided which includes a lower section 30 and an upper section 32, which sections are secured together by clamp 33. Mounted within the flask are a lower mold section or drag 34 and an upper mold section or cope 36. The two sections abut along joint 38.

Before the casting of the iron, the wires and their insulating sleeves are centrally located within the mold cavity by means of chaplets 40. As best seen in FIG. 7, each chaplet includes a stem 42 having an annular shoulder 44 projecting outwardly therefrom at approximately the center of said stem. A U-shaped channel 46 is mounted at the top of said stem.

In use, the base of stem 42 is forced into the bottom sand mold section until shoulder 44 is nested within the outer surface of the mold section. Thereafter thermocouple wires 12 and 14 and their associated insulating sleeves 18 and 20 are placed within U-shaped channels 46. The channels are of a width such as securely hold the sleeves in place without any lateral movement. Chaplets 40 are then forced into the upper mold section in such a position that they will rest on the tops of insulating sleeves 18 and 20 when the upper mold section is placed on the lower mold section, as seen in FIG. 6. In this manner the thermocouple wires will be held firmly in place prior to the casting of the iron.

After the wires have been locked securely in place by the chaplets 40, the mold cavity is then filled by pouring the molten cast iron down runner 48. As illustrated in FIG. 5, the process is shown with the mold cavity completely filled with the cast iron. Thus, as seen in FIG. 6, the cast iron 22 is shown as completely surrounding the wires and their associated insulating sleeves. Referring again to FIG. 5 it is seen that the lava seal 24, the ends of the insulating sleeves, and the rear ends of wires 12 and 14 are embedded in the sand of the mold. Thus, when the iron is cast, the rear edge 26 of the cast iron cylinder 22 will not cover the rear edge of lava seal 24 or the wires and their associated insulating sleeves.

In FIG. 6, the chaplets 40 are shown as remaining within the body of the cast iron cylinder 22. However, the chaplets normally used are those which are dissolved by the cast iron, in which case they will be absorbed by the cast iron. Alternatively, chaplets can be used which will not be attacked by the cast iron and thus will remain intact within the cast iron core. For this purpose, the chaplets are provided with partially severed stems immediately above shoulders 44, as shown at 50 in FIGS. 6 and 7. In this way, it is a relatively simple matter to snap the stems of the chaplets when removing the cast iron cylinder from the sand molds. It should also be noted that in FIG. 5 the chaplets are shown as being aligned in pairs and laterally spaced. However, if desired, the chaplets need not be aligned but can be staggered on opposite sides of the wires. The exact chaplets used and their manner of use form no part of this invention.

It is seen in FIG. 1 that the cylinder 22 has small ribs 52 on its top and bottom surface. These nibs are formed by the dissolving of the portion of the chaplets which is imbedded within the sand. Additionally, the outer surface of cylinder 22 contains a pair of parting lines 54 (FIGS. 1 and 6) which are formed by iron seeping into the joint 38 of the sand mold halves 34 and 36. The nibs 52 and parting lines 54 normally occur in sand casting. However, these elements form no part of the actual invention.

The thermocouple of this invention is used in the same manner as any other high temperature thermocouple of the prior art. Thus the wires 12 and 14 will be connected through a connecting head with a potentiometer. The thermocouple is then immersed in the bath of molten material whose temperature is to be determined. The primary use of thermocouples of this type is with molten aluminum. However, they can also be used for determining the temperature of any other liquid high temperature bath, such as liquid sodium-zinc.

As previously pointed out, the thermocouple of this invention possesses numerous advantages over the thermocouple of the prior art used for high temperature purposes. The most important of these advantages is the extended life of the thermocouple of this invention. One of the primary causes of the short life of the prior art high temperature thermocouples was discovered as being the fact of non-uniform wall thickness of the prior art cast iron cylinder having a central bore. Thus, in the sand molding of the cast iron a sand core had to be provided which was subsequently washed out. It was difficult in practice to maintain this sand core in a concentric position. However no such difficulty has been encountered in maintaining the concentricity of the insulating sleeves for the thermocouple wires of this invention during the sand casting of the cast iron.

Another difficulty of the prior art thermocouples was that once a leak occurred by the alloying of the molten aluminum and the cast iron, the prior art thermocouple would immediately be rendered useless. This is because the central bore of the prior art thermocouple would immediately fill with aluminum, thereby causing a short circuiting of the thermocouple wires and giving erroneous readings. This short circuiting occurred because the prior art insulators were segmented and the molten aluminum would seep between the segments, thereby contacting both thermocouple wires. Thus any reading that might be obtained would be at the very top of the open molten aluminum bath and would not be a true reading of the actual temperature of the interior of the bath. This occurred because the molten aluminum would seek its own level within the thermocouple bore. Even where segmented insulators were not used, the same result occurred because the molten aluminum would rise in the insulator sleeves through capillary action. Another problem was that once the bore was filled, the thermocouple wires would immediately be contacted by the aluminum and were usually useful for a maximum period of about three to four hours, even assuming there was no short circuiting.

In the thermocouple of the instant invention there is no central bore in which the molten aluminum can pass. Therefore, even when the walls of the cast iron cylinder 22 do erode, the molten aluminum will not immediately circulate through the interior of the thermocouple. Additionally, the molten aluminum will not penetrate through the glass insulators on the thermocouple wires.

Therefore in order for the thermocouple of this invention to fail, there must be a complete erosion of the cast iron surrounding the thermocouple wires.

Another advantage of the thermocouple of this invention is that a greater wall thickness of cast iron can be obtained when using the same amount of cast iron as the prior art. This was because provision had to be made in the prior art cast iron cylinders for a central bore of sufficiently large diameter to insure that the thermocouple wires and their insulators could be inserted with no difficulty. In the thermocouple of this invention no such central bore is necessary, in view of the fact that the cast iron is actually cast in and around the thermocouple wires. Thus a thicker wall and a smaller diameter thermocouple could be made using the same amount of cast iron as that necessary for the prior art thermocouples. This economy and efficiency in manufacture are a substantial advantage of the thermocouple of this invention.

An additional advantage of the thermocouple of this invention resides in the fact that no central bore is used. In the prior thermocouples there is always the possibility of the development of pin holes caused by air bubbles in the casting of the iron. Soon after the thermocouple is put in use, these pin holes would be opened by the molten aluminum and the aluminum would flow freely into the central bore, thereby rendering the thermocouple useless within an extremely short period of time. Using the thermocouple of this invention such a pin hole would have no effect on the operating efficiency of the thermocouple.

A further advantage of the thermocouple of this invention is that it possesses a better temperature response than the prior art thermocouple of this type. This is because the measuring junction is imbedded in the cast iron and will immediately reflect the temperature of the cast iron at the potentiometer. As will be appreciated, the cast iron will assume the same temperature as the molten aluminum or other liquid of the bath in which it is immersed. In the prior art thermocouples the measuring junction was in an air atmosphere and merely contacted the interior surface of the cast iron in the bore. Thus there was a time lag between the temperature of the cast iron being the same as that of the molten aluminum and the temperature of the air within the cast iron being the same as the temperature of the molten aluminum. This time lag does not occur using the thermocouple of this invention.

The thermocouple of this invention can be made in a variety of sizes, with the exact sizes depending on its use. For the most part, the diameter of the cast iron cylinder will be approximately one inch and will have a length varying from 18 inches to 48 inches. However, these sizes may be varied depending on the actual circumstances under which the thermocouple will be used.

Obviously many modifications and variations of the present invention are possible in the light of the above teachings. It is, therefore, to be understood that within the scope of the appended claims, the invention may be practiced otherwise than as specifically described.

What is claimed as the invention is:

1. An elongated thermocouple for measuring the temperature of molten metal comprising a first metal wire and a second metal wire, the metal of said first wire being dissimilar from the metal of said second wire, with one end of said first wire being joined with one end of said second wire to from a measuring junction, said wires being otherwise insulated from each other by electrically non-conductive and thermal shock resistant insulation, and said wires, said measuring junction and said insulation being encapsulated in an elongated unitary iron member, said iron member being formed by a casting operation about said measuring junction and said insulation in such manner that the iron is in direct surface contact with said junction throughout its entire extent.

2. The thermocouple of claim 1 wherein said measuring junction is formed by twisting said ends of said wires together.

3. The thermocouple of claim 1 wherein said iron member is substantially cylindrical in shape.

4. The thermocouple of claim 3 wherein the ends of said wires opposite the measuring junction project outwardly from the rear of said iron cylinder and are additionally spaced from the iron cylinder by an insulating seal imbedded in the rear end of said cylinder.

References Cited

UNITED STATES PATENTS

| 1,660,504 | 2/1928 | Grubb | 136—233 |
| 1,877,049 | 9/1932 | Raible | 22—184 |
| 1,924,280 | 8/1933 | Hobart | 22—184 |
| 2,052,921 | 9/1936 | Dockray et al. | 22—206 X |
| 2,997,513 | 8/1961 | Rall et al. | 136—201 |
| 3,283,580 | 11/1960 | Nanigian et al. | 136—230 X |

FOREIGN PATENTS

| 165,324 | 10/1904 | Germany. |
| Ad. 3,243 | 1911 | Great Britain. |
| 190,657 | 12/1922 | Great Britain. |

ALLEN B. CURTIS, *Primary Examiner.*